US008239888B2

(12) United States Patent (10) Patent No.: US 8,239,888 B2
Todd (45) Date of Patent: Aug. 7, 2012

(54) ADVERTISING METRICS SYSTEM AND METHOD

(75) Inventor: Marc A. Todd, Foxboro, MA (US)

(73) Assignee: IneoQuest Technologies, Inc., Mansfield, MA (US)

( * ) Notice: Subject to any disclaimer, the term of this patent is extended or adjusted under 35 U.S.C. 154(b) by 351 days.

(21) Appl. No.: 12/608,764

(22) Filed: Oct. 29, 2009

(65) Prior Publication Data

US 2011/0102600 A1 May 5, 2011

(51) Int. Cl.
*H04N 20/14* (2006.01)
*H04N 60/29* (2006.01)
(52) U.S. Cl. .............................. 725/22; 725/19; 725/21
(58) Field of Classification Search .................... 725/19, 725/21, 22
See application file for complete search history.

(56) References Cited

U.S. PATENT DOCUMENTS 7,627,878 B2 * 12/2009 Pouliot et al. .................... 725/22
2008/0127253 A1 * 5/2008 Zhang et al. .................... 725/35

OTHER PUBLICATIONS

Hartanto, et al., "Cumulative Inter-ADU Jitter Concept and Its Applications", 2001, pp. 531-534, Dept. of Information Engineering, The Chinese University of Hong Kong, Shatin, NT, Hong Kong; Dept. of Electrical and Electronic Engineering, University of Canterbury, Christchurch, New Zealand.

* cited by examiner

*Primary Examiner* — Hunter B Lonsberry
(74) *Attorney, Agent, or Firm* — Holland & Knight, LLP; J. Mitchell Herbert, Jr., Esq.; Mia K. Fiedler, Esq.

(57) ABSTRACT

The present disclosure relates to a system and method for monitoring audio-video (AV) streams transported over a network. The system may include at least one AV probe configured for installation at a network node. The at least one AV probe may be configured to receive an incoming AV stream at a native frame rate and to capture at least one thumbnail of the incoming AV stream at a sampling rate which is less than the native frame rate to form a thumbnail stream. The at least one AV probe may be further configured to timestamp and transmit the thumbnail stream, and to forward the incoming AV stream substantially in real-time. The system may further include at least one monitoring engine operatively connected with the at least one AV probe, the at least one monitoring engine configured to receive the thumbnail stream, capture AV data from the thumbnail stream, and transform the AV data into a visual representation of AV stream quality of experience (QoE).

26 Claims, 9 Drawing Sheets

900 receiving an incoming AV stream at one or more AV probes at a native frame rate
902 capturing thumbnails of the incoming AV stream at a sampling rate which is less than the native frame rate, to form a thumbnail stream
904 timestamping the thumbnail stream
906 transmitting the thumbnail stream to a monitoring engine
908 forwarding the incoming AV stream through the one or more AV output ports substantially in real-time
910

FIG. 9

ADVERTISING METRICS SYSTEM AND METHOD

TECHNICAL FIELD

The present disclosure relates generally to the field of audio visual (AV) streaming. More specifically, the present disclosure is related to monitoring and verifying AV content including advertisement insertion.

BACKGROUND

Audio visual (AV) content is typically distributed from one or more central locations to local markets over relatively complex networks spanning large geographical areas. This AV content is typically supported by advertisements. However, while the AV content is typically generated for wide distribution, e.g., to national or international markets, advertisements are often intended for comparatively narrow distribution, such as for regional or local audiences. Advertisements are thus often spliced into the AV content at the regional or local level. To accommodate this splicing, the originator of the AV content, e.g., the television network, typically supplies the content with embedded markers, such as those commonly referred to as "avails" and/or SCTE-35 advertisement cue signals. Local content providers, such as network affiliate television stations and/or cable television (CATV) operators may use these avails to properly insert these local advertisements. A typical hour of AV content, for example, may be provided with four avails each corresponding to a 30 second time slot, or two avails each corresponding to a one minute time slot. These time slots are thus available for insertion of local advertisements.

Automated equipment is typically used to detect the avails and to splice in the local advertising content to minimize errors. However, errors may occur due to many factors, including bottlenecks or other traffic issues within the content distribution network, by errors in placement or detection of the avails, or simply by poor quality of the advertisements being supplied to the local insertion point. Local advertisements may thus be spliced in too early or too late, at audio levels that may be too high or too low, or in generally poor condition. This may result in the advertisements overrunning portions of the program, the advertisements being cut off, and/or the advertisements simply being of generally poor quality. These errors are not only problematic from a Quality of Experience (QoE), but may also result in substantial refunds being due to advertisers who typically pay sizable fees for the airing of each 30 or 60 second advertisement.

A related problem pertains to verification of correct advertisement insertion. In this regard, it is often difficult for a local television station or CATV company to refute refund claims by advertisers who complain that their advertisements were improperly inserted, or were otherwise of poor quality at particular locations within the distribution network. Even in the event the quality of the program and advertisement are monitored by the television station or CATV company at the central insertion location, there is no guarantee that the quality of the content was satisfactory as experienced by the end user.

BRIEF SUMMARY

In a first implementation, a system for monitoring audio-video (AV) streams transported over a network is provided. The system may include at least one AV probe configured for installation at a network node. The at least one AV probe may be configured to receive an incoming AV stream at a native frame rate and to capture at least one thumbnail of the incoming AV stream at a sampling rate which is less than the native frame rate to form a thumbnail stream. The at least one AV probe may be further configured to timestamp and transmit the thumbnail stream, and to forward the incoming AV stream substantially in real-time. The system may further include at least one monitoring engine operatively connected with the at least one AV probe, the at least one monitoring engine configured to receive the thumbnail stream, capture AV data from the thumbnail stream, and transform the AV data into a visual representation of AV stream quality of experience (QoE).

In some embodiments, the at least one AV probe may receive the incoming AV stream through an AV input port, transmit the thumbnail stream through a network interface port, and forward the incoming AV stream through an AV output port. The AV input port and the network interface port may comprise a single bi-directional port.

In some embodiments, the at least one AV probe may be configured for respective installation between an AV tuner and AV destination customer premises equipment and the at least one AV probe may be configured to store the thumbnail stream for delayed transmission to the monitoring engine. The at least one AV probe may be configured to capture, timestamp, and transmit the thumbnail stream substantially in real-time. The AV probe may also be configured to transmit the thumbnail stream through the network interface port to the monitoring engine. The at least one AV probe may be further configured for receiving user data, and for transmitting the user data through the network interface port to the monitoring engine, the monitoring engine being configured to process the user data. The at least one AV probe may be configured for arrangement between a set top box (STB) and a television.

In some embodiments, the monitoring engine may be configured to receive a plurality of thumbnail streams from the at least one AV probe and to capture AV data from each of the plurality of thumbnail streams. The monitoring engine may be further configured to aggregate and transform the AV data into a visual representation of collective AV stream QoE. The monitoring engine may be configured to receive, capture, and transform the AV data substantially in real-time. The AV data may include at least one of AV content verification data, advertisement insertion data, and black screen detection data.

In some embodiments, the at least one monitoring engine may be configured to perform at least one of the following: monitoring advertisements in real-time; monitoring advertisements simultaneously across a plurality of AV streams; monitoring start and stop times of advertisements; verifying that avails were present at scheduled times; detecting SCTE-35 advertisement cue signals; detecting advertisement pre-rolls; detecting advertisement program in/out information; monitoring presence and timing of incoming splice messages; monitoring presence and timing of outgoing splice messages; monitoring splice event IDs; and generating AV quality metrics.

In some embodiments, the sampling rate may be less than or equal to at least one of about half the native frame rate or about one third the native frame rate. The sampling rate may be variable based on content of the AV stream.

In some embodiments, the monitoring engine may comprise an AV management module configured to collect and aggregate transport stream (TS) data pertaining to one or more transport streams. The AV management module may be configured to receive AV data from a plurality of monitoring engines. The AV management module may be further configured to correlate the AV data with the TS data.

In some embodiments, the AV stream may comprise at least one frame that has been decoded from an AV transport stream. The AV stream may comprise at least one frame that has been decoded from an MPEG-2 transport stream format.

In some embodiments, the AV data may be compared with at least one of an advertisement schedule file and an advertisement verification file to generate a result set, the result set configured to indicate whether an advertisement was displayed correctly, and if not, a reason for a display error.

In some embodiments, a management server may be included. The management server may be configured to receive an actual audio output measured from the STB and to compare at least one dialnorm value with the actual audio output.

In another implementation, a method for monitoring at least one audio-video (AV) stream transported over a network is provided. The method may include receiving an incoming AV stream at one or more AV probes at a native frame rate and capturing thumbnails of the incoming AV stream at a sampling rate which is less than the native frame rate, to form a thumbnail stream. The method may further include timestamping the thumbnail stream, transmitting the thumbnail stream to a monitoring engine; and forwarding the incoming AV stream through the one or more AV output ports substantially in real-time.

In some embodiments, the method may further include receiving the thumbnail stream at the monitoring engine, capturing AV data from the thumbnail stream; and transforming the AV data into a visual representation of AV stream Quality of Experience (QoE). In some embodiments, capturing may include capturing AV content verification data. The method may further include capturing user data.

In yet another implementation, an article of manufacture for monitoring at least one audio-video (AV) stream transported over a network is provided. The article may include a computer readable storage medium having a computer readable program code embodied therein. The computer readable program code, when executed by a processor, may result in the following operations: receiving an incoming AV stream at one or more AV probes at a native frame rate, capturing at least one thumbnail of the incoming AV stream at a sampling rate which is less than the native frame rate, to form a thumbnail stream, timestamping the thumbnail stream, transmitting the thumbnail stream to a monitoring engine, and forwarding the incoming AV stream through the AV output port substantially in real-time.

The details of one or more implementations are set forth in the accompanying drawings and the description below. Other features and advantages may become apparent from the description, the drawings, and the claims.

BRIEF DESCRIPTION OF THE SEVERAL VIEWS OF THE DRAWINGS

Like reference symbols in the various drawings may indicate like elements.

DETAILED DESCRIPTION

In this disclosure, the term "native frame rate" is used consistently with its use by those skilled in the art of AV distribution, to refer to an AV stream that is independent of any transport stream. Examples of native frame rate AV streams include those that have been decoded from a transport stream (TS) such as an MPEG-2 transport stream. Other examples include AV streams that have been decoded from a packetized transport stream such as an IP (Internet Protocol) transport stream, which may, for example, include an MPEG-2 transport stream. The term "computer" is meant to encompass a workstation, personal computer, personal digital assistant (PDA), wireless telephone, or any other suitable computing device. Terms such as "component(s)," "device(s)," and the like are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server (or control related devices) can be components. One or more components may reside within a process and/or thread of execution and a component may be localized on one computer and/or distributed between two or more computers or control devices.

The term "real-time" refers to sensing, detecting, capturing and/or responding to external events nearly simultaneously (e.g., within milliseconds or microseconds) with their occurrence, or sufficiently fast to enable the device to keep up with an external process such as AV content transmission along a network.

Systems and methods embodying the present invention can be programmed in any suitable language and technology, such as, Hypertext Markup Language (HTML), Active ServerPages (ASP) and Javascript. Alternative versions maybe developed using other programming languages including, but not limited to; C++; Visual Basic; Java; VBScript; Jscript; BCMAscript; DHTM1; XML and CGI. Any suitable database technology can be employed, but not limited to: Microsoft Access and IBM AS 400.

Figure 1:
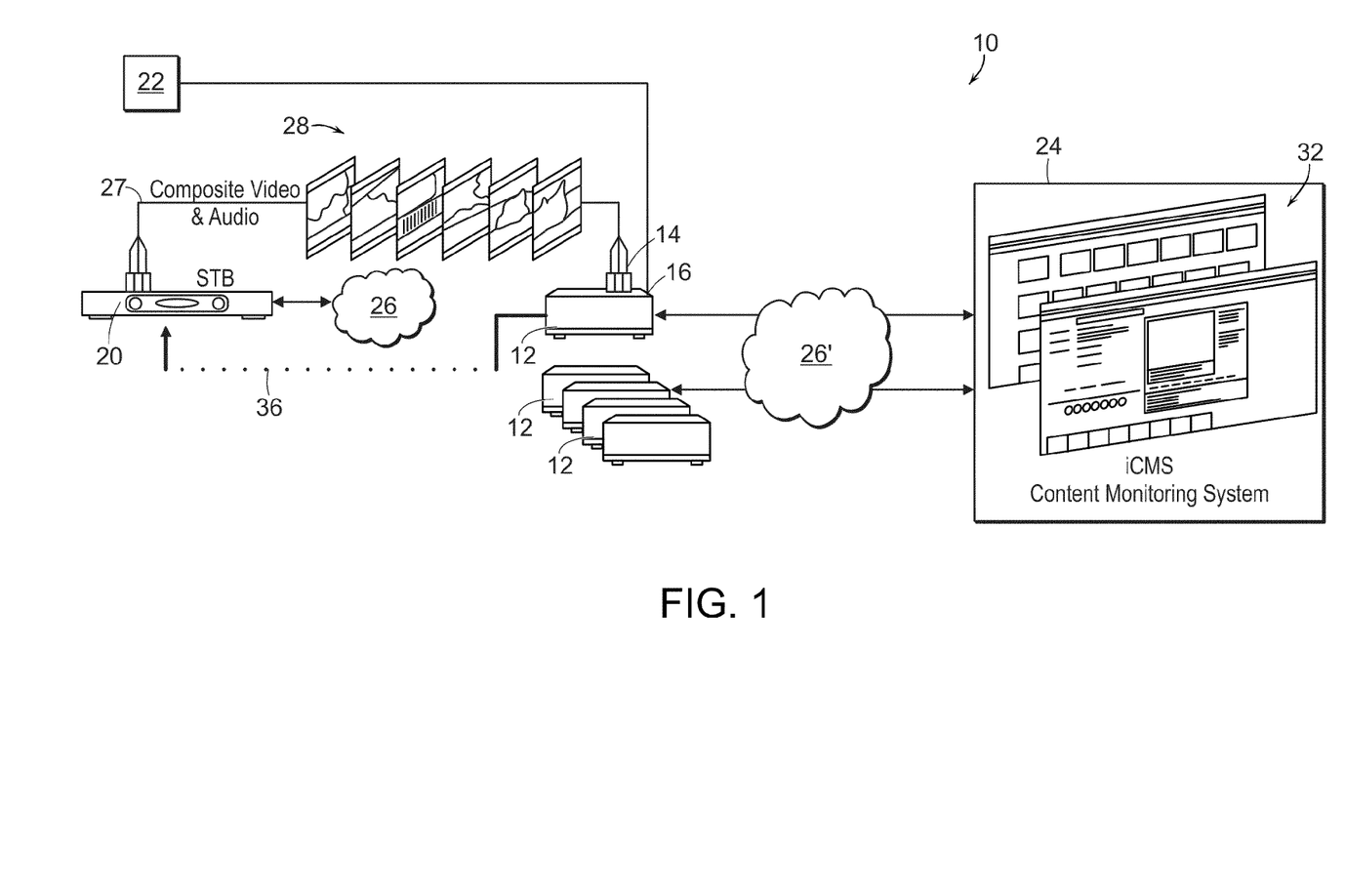
FIG. 1 is a schematic view of an embodiment of the present disclosure.

Turning now to FIG. 1, an embodiment of the present invention includes a system 10 for monitoring user quality-of-experience (QoE) for audio-video (AV) streams transported over a content distribution network 26. This network 26 may include a CATV (Cable Television) network, satellite television network, and/or other Video on Demand (VoD) network such as the Internet, etc. As shown, system 10 includes one or more AV probes 12 having an AV input port 14, and an AV output port 16, and a network interface port (such as shown at 18 in FIG. 2). The AV probe 12 is configured for deployment at a node of the AV network, between an AV tuner 20 such as a Set Top Box (STB), and AV destination customer premises equipment (CPE) 22 such as a television.

System 10 also includes at least one processing engine 24 coupled to the network interface port of the probes 12 via a communications network 26'.

It should be recognized that communications network 26' may be separate and distinct from the aforementioned content distribution network 26, or alternatively, may be substantially the same network, and/or may share common elements. For example, portions (or substantially all) of both networks 26, 26' may include the Internet. Alternatively, networks 26, 26' may include a conventional bi-directional CATV network, in which AV content flows to the user in one direction, and user instructions, such as VoD selections and the like, flow on the same network in the opposite direction.

AV probe 12 may be configured for receiving an incoming AV stream 27 from AV tuner 20 through input port 14 at a native frame rate. As will be discussed in greater detail hereinbelow, AV probe 12 may be configured to capture thumbnails 28 of the incoming AV stream 27 at a sampling rate which is less than the native frame rate, to form a thumbnail stream 30 (FIG. 3), and to apply timestamps to the thumbnails 28 of the thumbnail stream 30. AV probe 12 may also be configured to transmit the captured thumbnail stream 30 (e.g., through network port 18, FIG. 2) to monitoring engine 24 substantially in real-time, via network 26. Probe 12 may also be configured to forward the native incoming AV stream 27 through the AV output port 16 substantially in real-time, e.g., for use by CPE (e.g., television) 22.

Monitoring engine 24 may take the form of computer readable program code disposed on a computer readable medium such as a ROM (Read Only Memory) device incorporated within one or more computers or servers. As shown, this monitoring engine 24 may be disposed remotely from the one or more probes 12, being communicably coupled thereto via network 26'. Engine 24 may be configured to receive and process the thumbnail stream 30 (FIG. 3) to transform stream 30 into a visual representation of AV data 32, e.g., substantially in real-time. In particular embodiments, the AV data representation 32 may include video (AV) content verification data, including advertisement insertion data, as will be discussed in greater detail hereinbelow.

In the aforementioned embodiment, AV input port and network interface port are shown and described as separate and distinct elements 14 and 18. It should be recognized, however, that in some embodiments, these ports may be effectively combined into a single device. For example, AV input port 14 may be configured for bi-directional operation, to transmit thumbnail stream 30 back to AV tuner 20 where it may then be transmitted via network 26 to monitoring engine 24.

Moreover, optionally, probe 12 may be configured to capture user data and to transmit this captured data to the monitoring engine 24. For example, probes 12 deployed in a user's premises as shown, may be configured to receive user input such as channel selection, VoD selection, and/or the amount of time spent viewing such content, via a conventional remote control device. This user input may then be communicated to AV tuner 20, such as by a conventional IR blaster shown in phantom at 36, to permit the tuner to operate in a conventional manner, i.e., to tune the user's STB 20 to the particular channel desired by the user. This approach may thus enable user data, including audience metrics such as the aforementioned channels/content viewed and the amount of time spent viewing such content, etc., to be conveniently captured by the probe 12 and forwarded, along with the various thumbnail streams 30, to monitoring engine 24 for use in visual representation 32.

System 10 may thus be used for baseband video and audio fault monitoring (live and/or historical), baseband video auditing and reporting, channel monitoring/scheduling, via distributed management, as well as for advertisement insertion monitoring. For example, various embodiments of the present disclosure may be used for monitoring advertisements in real-time, including start and stop times of advertisements, verifying that avails were present at scheduled times, detecting SCTE-35 advertisement cue signals including pre-rolls and program in/out information, monitoring presence and timing of incoming splice messages, monitoring presence and timing of outgoing splice messages, monitoring splice event IDs, generating AV quality metrics, and combinations thereof, as will be discussed in greater detail hereinbelow. Moreover, as will be discussed with respect to FIGS. 4 and 5, these capabilities may be effected using multiple probes 12, across multiple AV streams/channels which are optionally changed by either the user as discussed above, or centrally upon commands distributed to the probes from monitoring engine 24.

Figure 2:
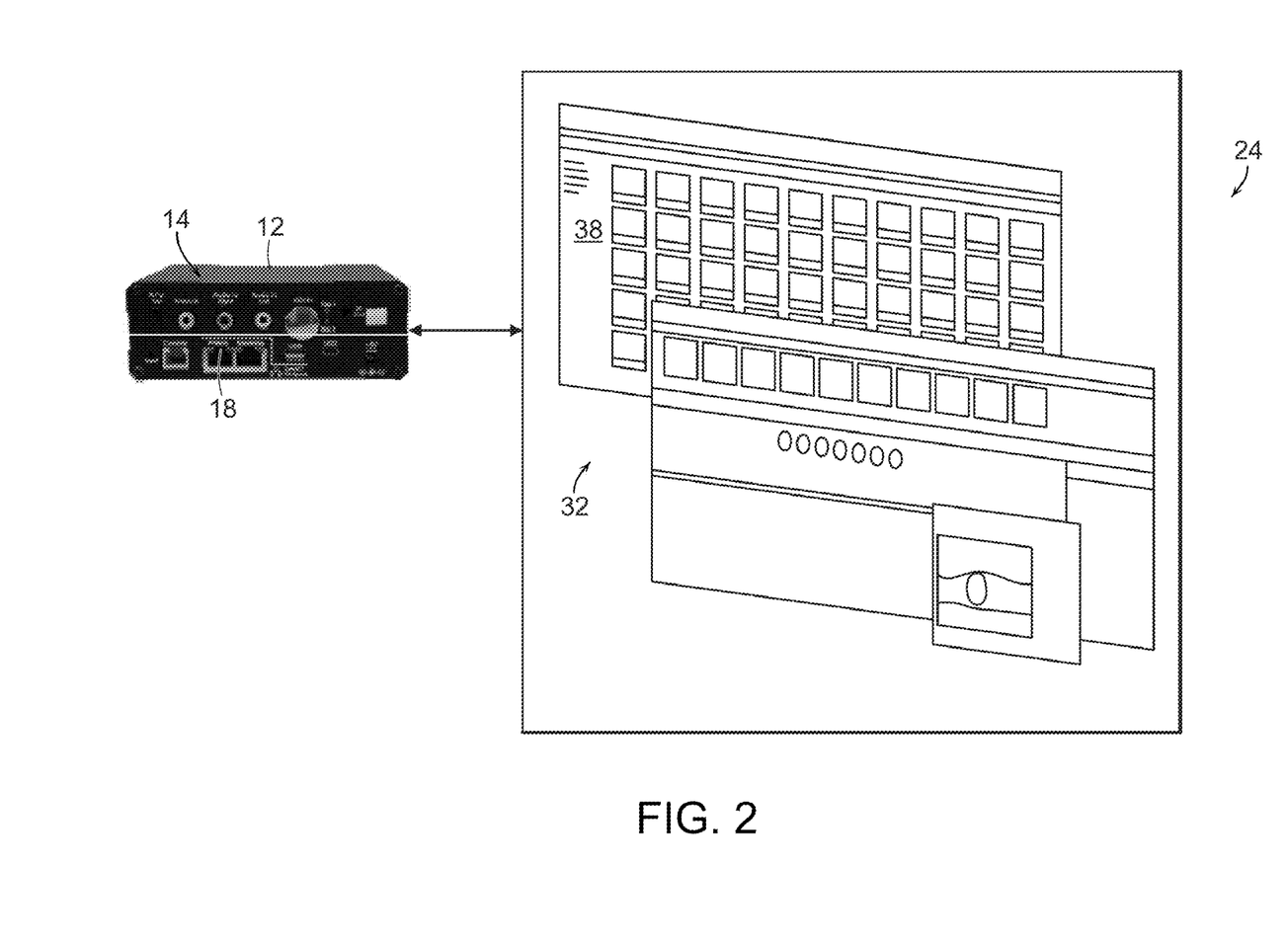
FIG. 2 is a view, on an enlarged scale, of elements of the embodiment of FIG. 1.

Turning now to FIG. 2, aspects of system 10 will be described in greater detail. In particular embodiments, probe 12 may include AV input port(s) 14, e.g., in the form of conventional composite or component inputs, and a network interface port 18, e.g., in the form of a conventional RJXX port. Probe 12 may also include a data storage device, e.g., in the form of a disk drive, flash drive or other memory device, configured to store and/or archive the various thumbnail streams 30, for DVTA (Digital Video Thumbnail Archiving). Alternatively, or in addition, probe 12 may be configured for substantially real-time transmission of thumbnail streams 30 for DVTA at monitoring engine 24, Probe 12 may thus be configured to monitor substantially in real-time, video (AV) streams 27 (FIG. 1), e.g., by capturing a series of thumbnails 28 thereof. Probe 12 may thus be configured for remote baseband video (AV) monitoring in real-time, including black screen and freeze frame detection, audio channel level detection, video intensity level detection, storing the captured thumbnails for auditing, remote real-time visual inspection, and/or historical and offline content inspection (e.g., advertisement insertion verification as discussed below).

In particular representative embodiments, for example, probe 12 may be capable of capturing video thumbnails at up to 8 thumbnails or more per second, and for storing up to 30 minutes of jpeg thumbnails in the probe, at a capture rate of 1 thumbnail per second for approximately 1800 samples. These captured thumbnails and statistics/measurements may be subsequently uploaded to monitoring engine 24 as discussed hereinabove. As also mentioned above, probe 12 may be used, e.g., upon instructions sent from monitoring engine 24, to control the STB 20, e.g., via IR Blaster 36 or similar control means. In this manner, probe 12 may be used to perform various additional functions, such as scanning channels, changing channels, locking to a particular channel, remotely power cycling STB 20, and/or capturing various audience metrics based on user selections.

As also shown, monitoring engine 24 may be configured to generate a visual representation or transformation 32 of captured data that may include, for example, a mosaic view 38 that shows simultaneous thumbnail views from multiple probes 12. Alternatively mosaic view 38 may show sequential thumbnails from a single probe 12. Visual representation 32 may thus provide a graphical representation of the foregoing data including baseband video and audio levels, metrics/statistics, with alarming at minimum and maximum thresholds, video frame statistics, reports, logs with time stamps and/or marked with comments, and thumbnails such as to verify content. Monitoring engine 24 may also be optionally configured for integration with an AV management module 42 (FIG. 6) as will be discussed in greater detail hereinbelow.

Figure 3:
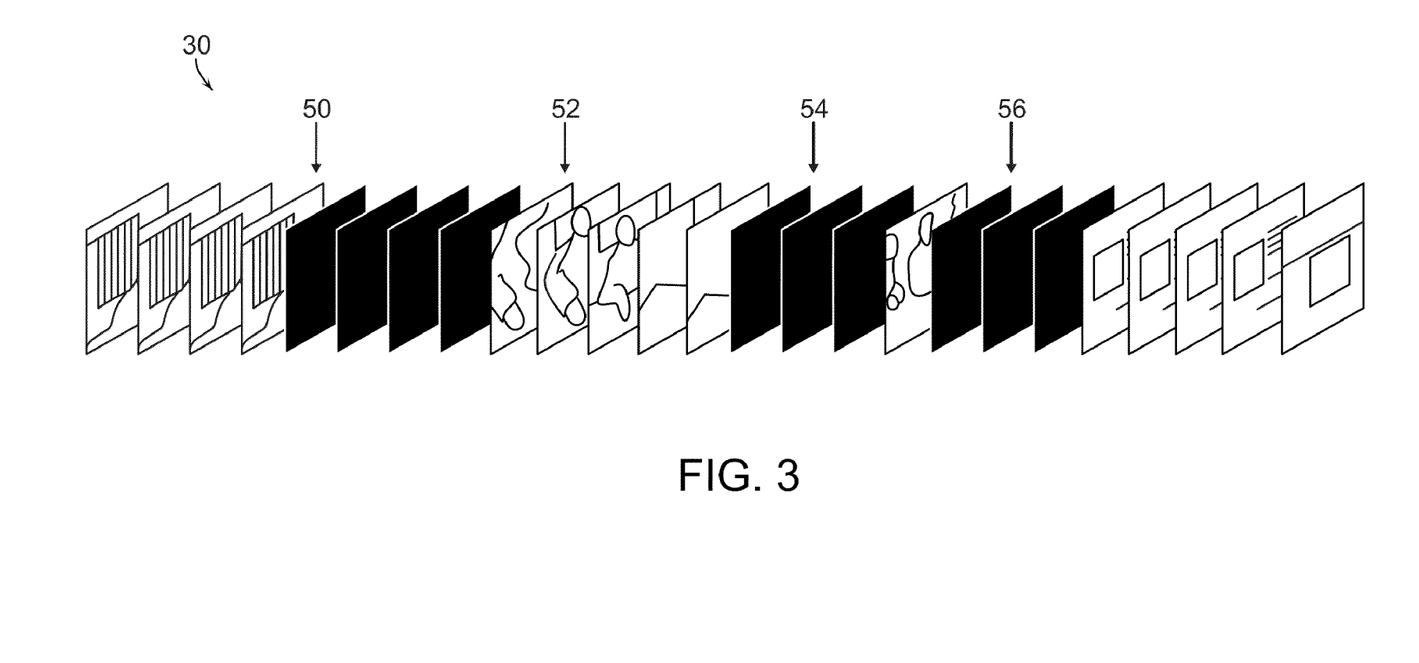
FIG. 3 is a schematic view of a thumbnail stream, generated by the embodiment of FIGS. 1 and 2.

Referring now to FIG. 3, an exemplary captured thumbnail stream 30 is shown. Once this stream has been captured, probe 12 may inspect the stream to generate the various metrics/functions described herein. This inspection may be accomplished using substantially any conventional video detection approach, such as comparing the pixels of adjacent thumbnails to determine the number of pixel changes therebetween. This inspection may also include comparing the thumbnails to the various embedded markers used for insertion of advertisements or other content.

For example, when monitoring advertisement insertion, a probe 12 may inspect stream 30 to identify the end of a first advertisement at 50, and the beginning of a second advertisement at 52, followed by black screens at 54 and 56. This inspection may provide verification that both the first and second advertisements were in fact inserted into the original AV stream 27 (FIG. 1) from which thumbnail stream 30 was derived. This inspection may also reveal, for example, that an undesirably high number of black screens occurred between 50 and 52, e.g., to indicate a late splice of the second advertisement. As mentioned hereinabove, such late splicing may be undesirable, as it generally means that a portion of the advertisement, and/or subsequent content, was cut off, and consequently, a refund of fees may be due, such as to an advertiser whose advertisement was cut short. This inspection may thus be used to capture a wide range of metrics and to display visual representations thereof, including delivery status, content outages, bit rates, advertisement splice performance including start and end of splice, early or late start or end of splice, black frame performance, including appropriate distribution of black frames pre- and post-splice, freeze frames, and audio levels during the advertisement, for generation of audio level histograms (pre-, during and post-).

As another example, when monitoring baseband video and audio, an inspection of stream 30 may indicate the presence of good content at 50, followed by black screens before a program change at 52, which was followed by additional black screens at 54 and 56. This inspection thus may provide for example, verification of the presence of good content, while also indicating an undesirably high number of black screens between 50 and 52, and a desirable number of black screens at 54 and 56. In this manner, such an inspection may be used to capture metrics that are used to generate visual representations of the baseband AV stream 27 (FIG. 1) substantially in real-time, for video and audio faults, black screen detection, intensity levels, and freeze frame, etc.

In various embodiments, the incoming AV stream 27 (FIG. 1) thumbnails are captured (i.e., the stream 27 is sampled) at a sampling rate that is about half the native frame rate or less. For example, the native frame rate of a conventional AV stream 27 in the U.S. is 30 frames per second, while the native frame rate in Europe and Asia is generally 24 frames per second. So, for example, if the native frame rate of stream 27 is 30 frames per second (fps), probe 12 may capture thumbnails for use in stream 30, at a sampling rate of 15 fps or less. In particular applications, a sampling rate of about one third the native frame rate or less, may be desired. Stream 30 may also include a captured audio sample associated with the various thumbnails. The results of each of these inspections may then be transformed into visual representations 32 (FIG. 2) as described hereinabove.

In addition, the sampling rate may be varied, to permit some content to be sampled at a higher rate that other content. For example, to further conserve resources, the sampling rate may be adjusted to a relatively low rate of 1 fps for a television show, and then adjusted to a higher rate (and thus higher resolution) of 8 fps for advertisements, e.g., upon receipt of an SCTE-35 advertisement cue signal. This capture of thumbnails at a frame rate that is substantially lower than the native frame rate, enables the AV stream 27 to be accurately monitored using a fraction of the resources that would be required to monitor AV streams in a conventional manner at their native frame rates. This relatively high efficiency may be further enhanced by this adjustment of the sampling rates to emphasize higher resolution when monitoring selected content such as advertisements, which may be particularly sensitive to miscues, black screens, etc., due to their relatively short duration and high cost.

Figure 4:
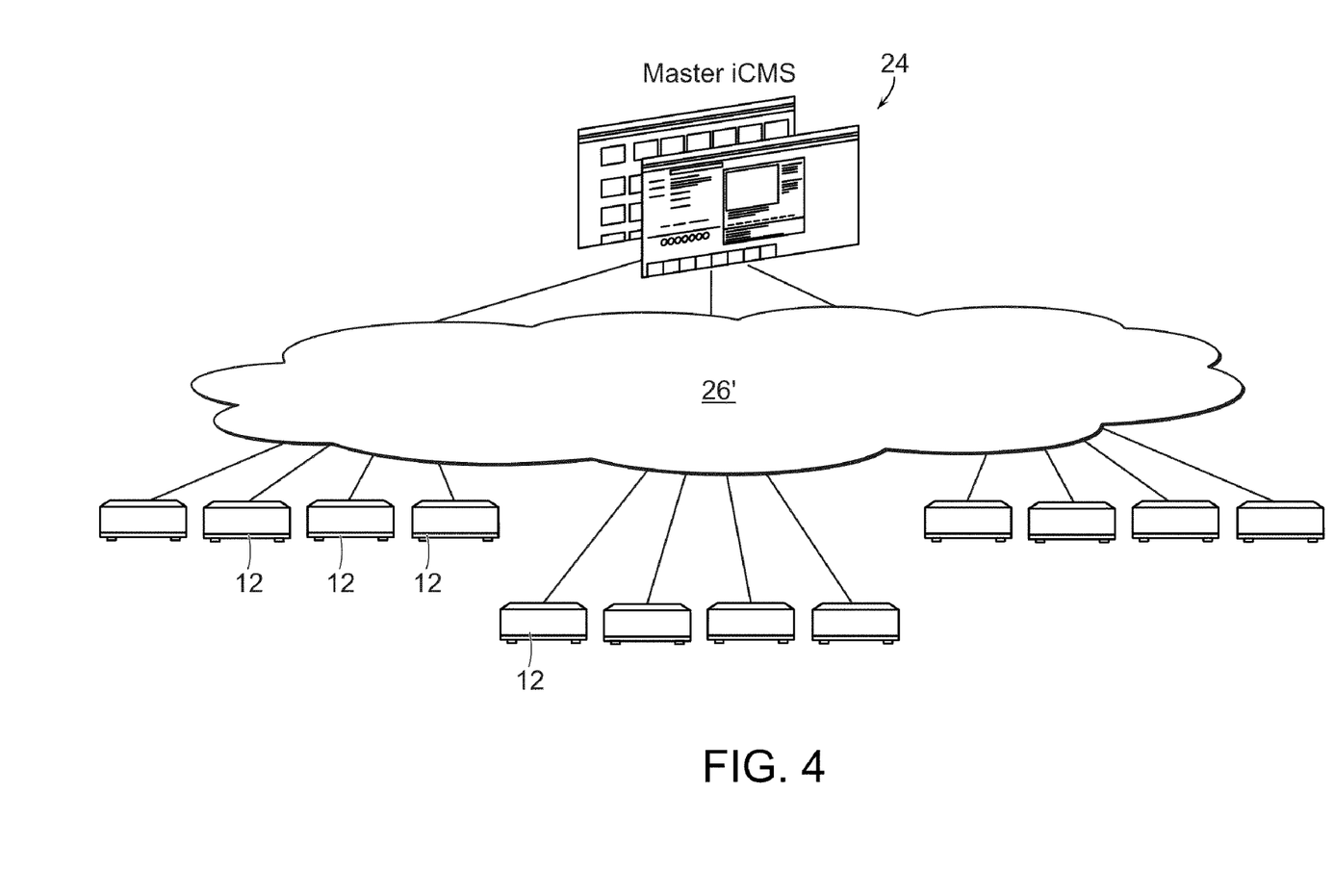
FIG. 4 is schematic view of portions of an embodiment similar to that of FIGS. 1-3, in another representative application.
Figure 5:
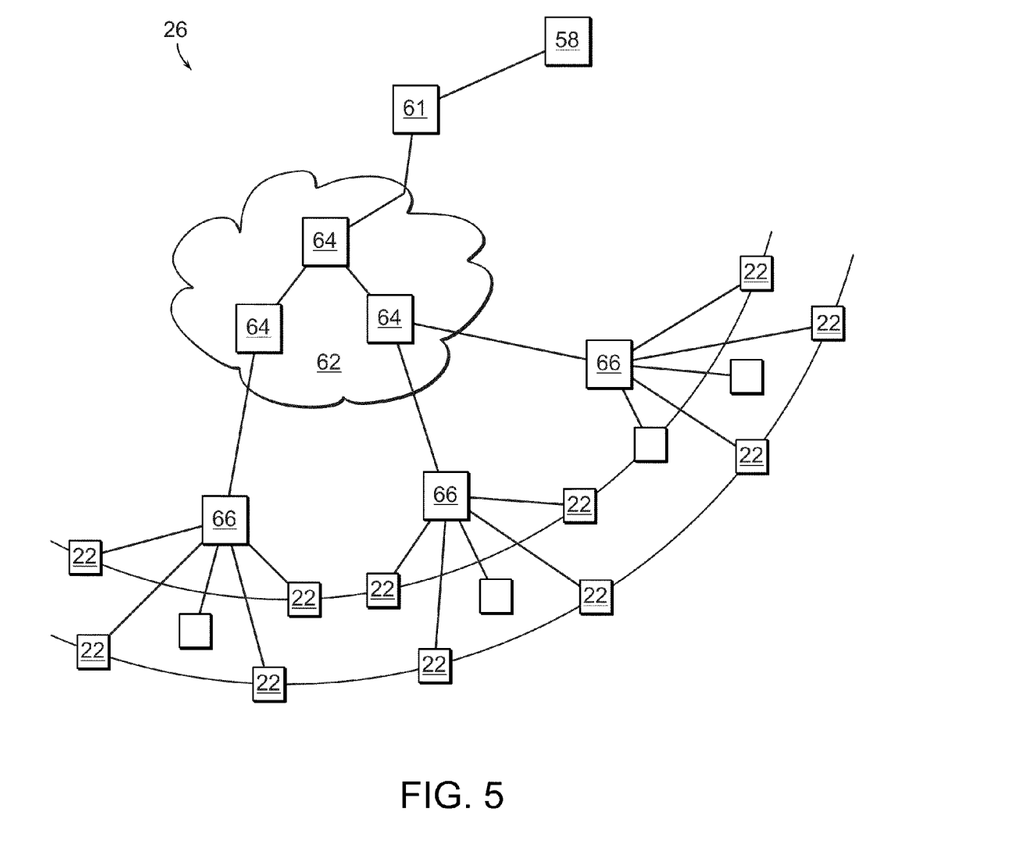
FIG. 5 is a schematic view of a content distribution network within which embodiments of the present disclosure may be deployed.

Turning now to FIGS. 4 and 5, as mentioned above, substantially any number of probes 12 may be deployed to send thumbnail streams 30 to monitoring engine 24, either substantially in real-time or delayed. As shown in FIG. 4, these probes 12 may be configured to send streams 30 via communications network 26'. Moreover, as shown in FIG. 5, these probes 12 may be placed at any number of locations within content distribution network 26, which locations may be distributed laterally, e.g., at various end user STBs 20 (FIG. 1), and hierarchically within network 26. This use of multiple probes 12 may provide for distributed data capture, which may then be aggregated at one or more central locations (e.g., at engine 24) for monitoring. This approach thus provides for a relatively broad and deep view of the performance of network 26, which facilitates such activities as channel scheduling in which various probes 12 may monitor specific channels at specific times. This configuration may also be used to monitor and log the load balance within network 26, by tracking the distribution of users tuning in to particular channels across the network. Still further, the hierarchical placement of probes 12 may be used to monitor a particular AV stream 27 at various locations throughout its transport. Monitoring engine 24 may thus aggregate and compare the streams 30 received from multiple probes, disposed at various hierarchical levels within network 26, and tuned to the same channel for the same AV content. This data may then be aggregated to generate metrics associated with the quality of the AV stream 27 along its transport to an end user.

Figure 6:
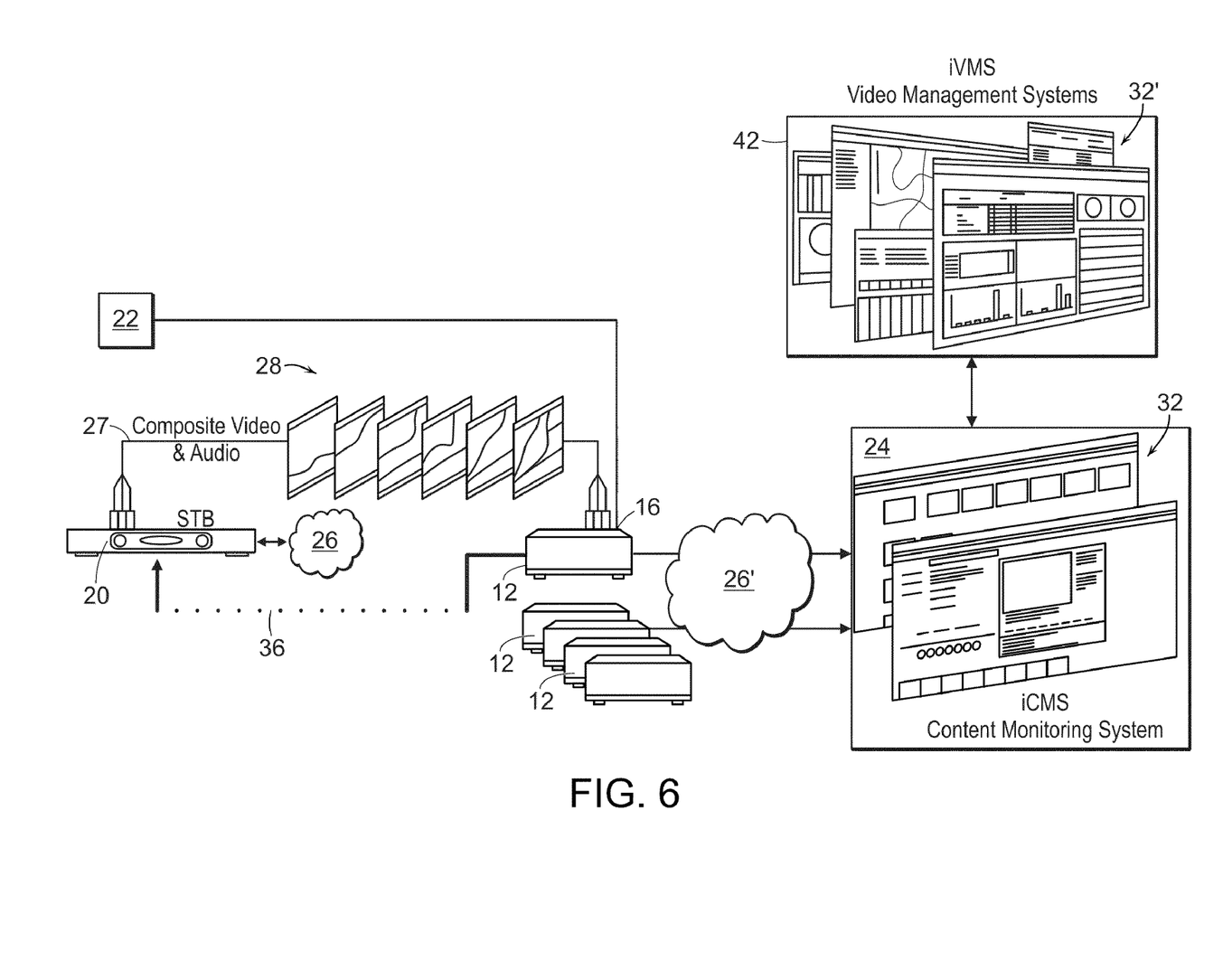
FIG. 6 is a view similar to that of FIG. 1, including an alternate embodiment of the present disclosure.

Alternatively, or in addition, data pertaining to the transport stream itself, including aspects thereof that may be associated with traffic, bottlenecks, etc., within network 26, may be obtained in a conventional manner. This data may, for example, be obtained by an iVMS™ Video Management System commercially available from IneoQuest Technologies, Inc. (Mansfield, Mass.), such as shown as AV management module 42 (FIG. 6). This transport stream data may be correlated to the data aggregated by monitoring engine 24 to produce a composite visual transformation 32 as discussed hereinbelow with reference to FIG. 6.

Such hierarchical placement of probes 12 within the content distribution network 26 is shown, for example, in FIG. 5, in which a representative content distribution network 26 may include a content originator 58 such as a broadcasting network, which transmits content to a packetized or non-packetized data source (e.g., VoD headend) 61, such as a cable television (CATV) company or the like. Data source 61 may be configured to forward a Transport Stream (TS), such as packetized video, via suitable link to a network core 62, which may include some combination of asynchronous transfer mode (ATM), frame relay, IP (e.g., Internet), and/or conventional MPEG-2 transport stream networks. As shown, the TS may pass through various network elements, such as one or more routers 64, and/or peripheral elements 66 such as DSLAMs (Digital Subscriber Line Access Multiplexers), before arriving at an end user's tuner 20. Those skilled in the art will recognize that a DSLAM may be a network element, usually located at a telephone company central office, that demultiplexes signals received via network 12, and distributes them to end users via Digital Subscriber Line (DSL) connections.

As mentioned hereinabove, the AV stream supplied by content originator 58 typically includes various markers embedded in the native frame rate that are used by the CATV company or VoD provider, e.g., at head end 61 or at other nodes within the network 26, to splice in content such as programming and advertisements targeted towards their local end users. Examples of such markers include those commonly known as 'avails', SCTE-35 advertisement cue signals including pre-rolls and program in/out information, incoming and outgoing splice messages, and splice event IDs, etc.

Probes 12 (FIG. 4) may be placed nominally anywhere within network 26, e.g., at substantially any of the aforementioned network nodes, to effect the aforementioned monitoring. In this regard, it should be recognized that the TS may be decoded into a native stream 27 by an AV tuner deployed at any number of the aforementioned network nodes, such as to facilitate the aforementioned monitoring and/or content insertion functions. For example, content transmitted by a source 58 such as a television network may be typically received and decoded by a CATV company at head end 61 for insertion of local advertisements, etc. A probe 12 may thus be placed at head end 61 to verify the quality of the content received from source 58. Alternatively, probes 12 may be spaced further downstream, such as with or within network elements/nodes 64 of network core 62, at peripheral network elements/nodes 66, and/or at locations therebetween. Probes 12 may thus be deployed to receive the decoded native stream 27 at node 61, or substantially any of the other nodes. In this manner, any number of probes 12 may be effectively deployed between an AV tuner, e.g., associated with the particular node, and the AV destination customer premises equipment (CPE) 22.

Moreover, it should be recognized that the various probes deployed throughout network 26 may be operated remotely, such as to monitor a range of channels. For example, a CATV operator may program various probes 12 disposed along network 26 to monitor e.g., any advertisements playing on a particular network (e.g., ABC or CNN). Alternatively, probes 12 may be placed in scan mode, e.g., either in synchronicity with other probes 12, or independently of other probes, to monitor a range of channels at various intervals.

In the aforementioned embodiments, probes 12 have been shown as discrete, stand-alone devices that are separate and distinct from AV tuner 20 (FIG. 1) and from network elements/nodes 61, 64, 66, 22, etc., and which may be inserted in series with an existing network link, such as using fiber, copper, or wireless interfaces. It should be recognized, however, that in alternative embodiments, probes 12 may be incorporated (e.g., co-located), within a network element/node 61, 64, 66, etc., with or without an AV tuner.

Turning now to FIG. 6, as mentioned above, monitoring engine 24 may include, or be otherwise integrated with an AV management module 42. This module 42 may be co-located with, or disposed remotely from monitoring engine 24. In particular embodiments, as discussed hereinabove, module 42 may be an iVMS™ Video Management System (IneoQuest) which collects and aggregates data pertaining to one or more transport streams as they are conveyed through content distribution network 26. In addition, module 42 may be configured to receive data from a plurality of monitoring engines 24 and to correlate this data with that of the various transport streams. In this manner, data from multiple probes 12 which have been aggregated at a particular monitoring engine 24 may be further aggregated at module 42 for a relatively comprehensive analysis of content distribution network 26. For example, data from probes 12 deployed along substantially the entire length of a typical TS route through network 26, may be conveniently aggregated with conventional transport stream data to provide a user with a visual transformations 32' corresponding to AV data/quality along substantially the entire length of the TS route, e.g., from head-end 61 to users' CPE 22.

Figure 7A:
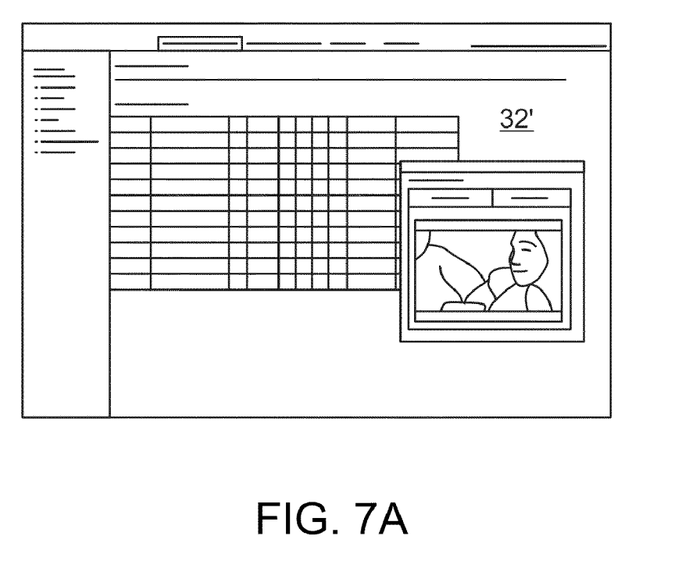
FIGS. 7A and 7B are screen shots of representative data transformations generated by the embodiments of FIGS. 1-6.
Figure 7B:
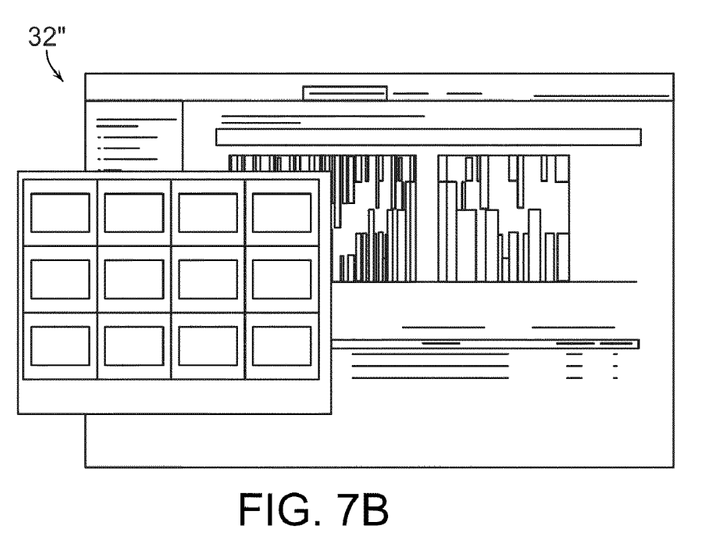

Referring now to FIGS. 7A, 7B, representative examples of the various transformations generated by monitoring engine 24 and/or management module 42 are shown and described. For example, visual transformation 32' may include data in a tabular format with representations of individual thumbnails. Visual transformation 32" may include a mosaic of various thumbnails associated with one or more captured streams 30, e.g., associated with a single AV channel or multiple channels. Alternatively, the thumbnail mosaic may include substantially the same thumbnail captured at multiple points within the distribution network 26. Transformation 32" may also include reporting capabilities such as histograms or charts which summarize the captured data, e.g., pertaining to audio or visual levels within the captured thumbnails, etc. Moreover, in particular embodiments, transformation 32" may include metrics associated with particular transport streams, such as provided by management module 42.

Figure 8:
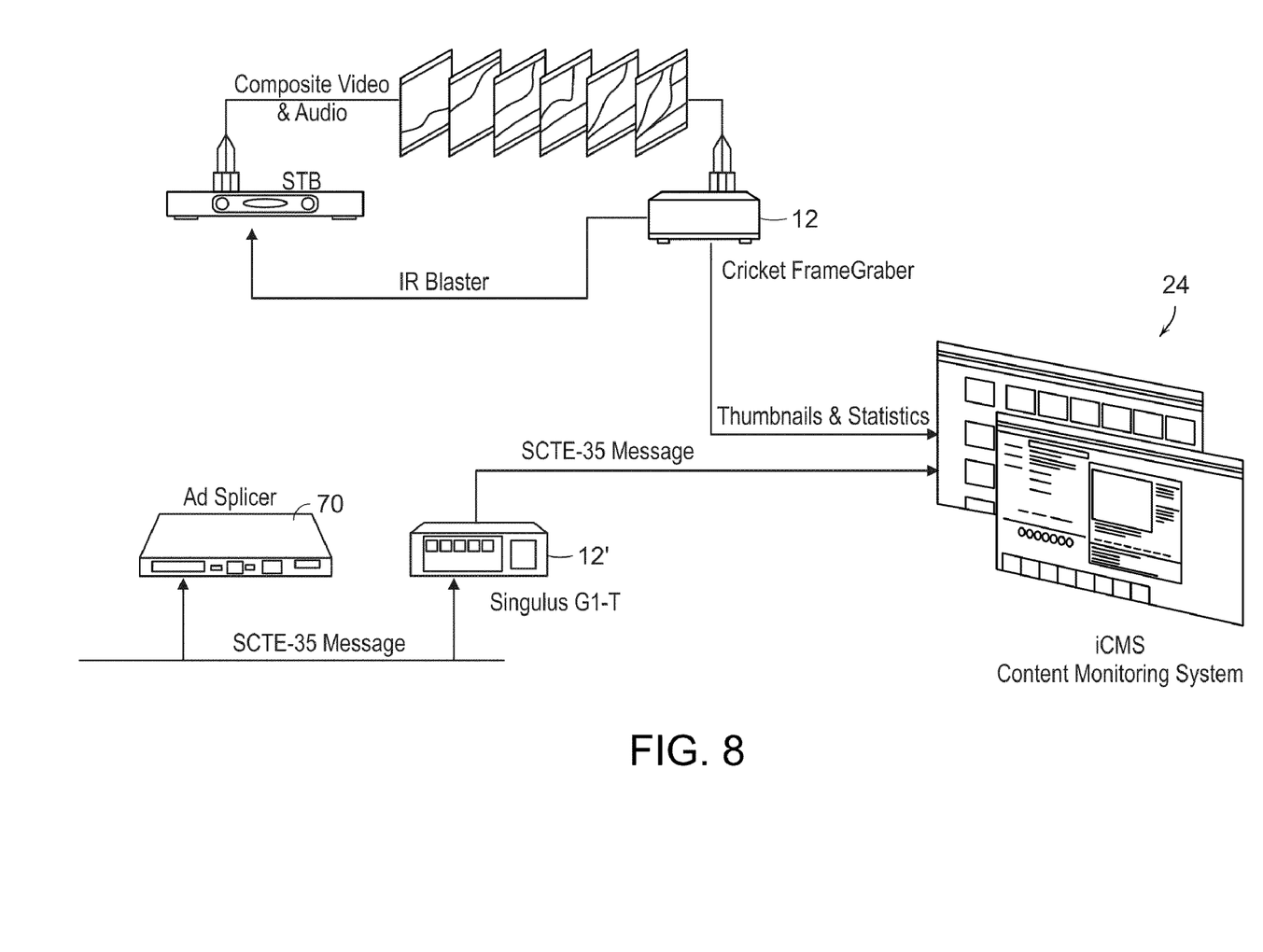
FIG. 8 is a view similar to those of FIGS. 1 and 6, of another embodiment of the subject invention.

Turning now to FIG. 8, it should be recognized, in light of the instant disclosure, that any number of devices known to those skilled in the art may be configured to accomplish the aforementioned functions associated with probe 12. Examples of such devices may include, but are not limited to, the Singulus G10™, Geminus G10™, Geminus G2X™, Singulus G1-T™, Geminus G1-T™, IQMediaMonitor™, and IQDialogue™ devices, all commercially available from IneoQuest. For example, a Singulus G1-T™ shown at 12' may be used to monitor the insertion of advertisements as effected by a conventional advertisement splicer 70 that may be deployed, for example, at head end 61 of content distribution network 26 (FIG. 5). The data captured by probe 12', including thumbnail stream 30 (FIG. 2) generated thereby, may thus be combined with data captured by one or more probes 12, at monitoring engine 24.

It should be recognized that various advertisement servers and/or advertisement splicers 70 may include a lineup of which advertisement is to be inserted where (including which time zone) and when. Monitoring engine 24 and/or management system 42 may capture that lineup and then compare it with the thumbnail streams 30 captured at the particular locations and times, for verification.

In some embodiments, advertisement splicers 70 may be configured to provide one or more of a customer ad schedule and ad verification files. One or more components of system 10 (e.g., monitoring engine 24) may be used to automatically compare, on a periodic basis, some or all of the customer's ad schedule files and ad verification files from ad splicers 70 to the actual SCTE35 tones that occurred during that time period. Using this information, system 10 may be configured to generate a result set or Ad Run report configured to indicate whether an advertisement was displayed correctly, and if not, a reason for a display error. This report may indicate to the customer the advertisements that played and which advertisements did not. The Ad Run report may also include specific information regarding the reason for the failure, including, but not limited to, a missed tone, etc.

In some embodiments, system 10 may be configured to measure an audio level associated with a given AV stream for comparison purposes. For example, audio levels from the output of the STB may be measured and directed through an averaging filter in the AV probe in order to set an alarm which may be sent to the management server. In some embodiments, the management server may also receive an indication of the loudness. In the server, a comparison may be performed between the dialog normalization (i.e., dialnorm) values that have been decoded from the AV stream with the measured audio levels to identify audio level shifts that may be in error and to identify the video that was playing at that time (the dialnorm value may refer to the control signal or meta data used to create a relatively consistent consumer dialog level between various programs and channels). The data may be compared to an ad schedule similar to those discussed above. In this way, system 10 may be used to compare actual audio levels with dialnorm values, and to make the threshold user configurable.

Figure 9:
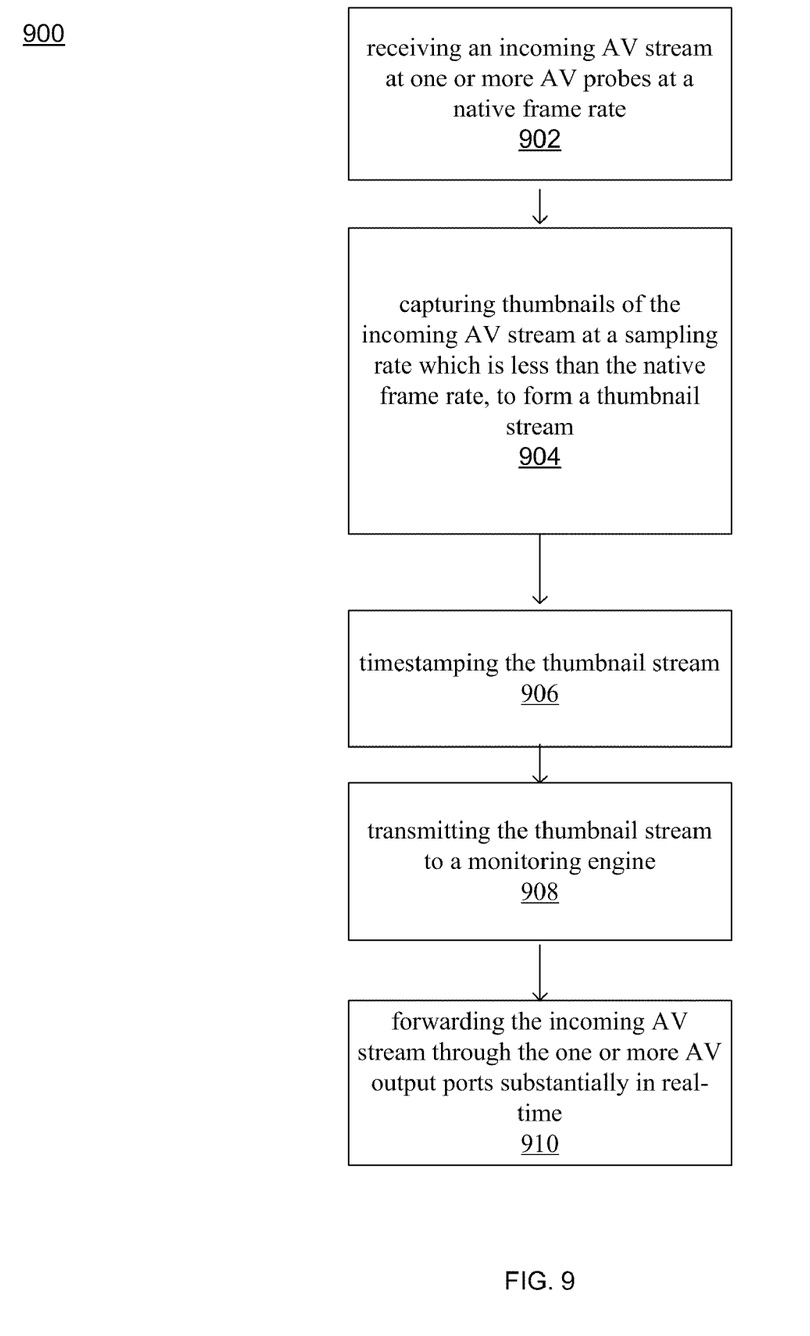
FIG. 9 is a flow chart of an embodiment of the present disclosure.

Referring now to FIG. 9, an exemplary method 900 for monitoring at least one audio-video (AV) stream transported over a network in accordance with the present disclosure is provided. Method 900 may include receiving an incoming AV stream at one or more AV probes at a native frame rate (902) and capturing thumbnails of the incoming AV stream at a sampling rate which is less than the native frame rate, to form a thumbnail stream (904). Method 900 may further include timestamping the thumbnail stream (906), transmitting the thumbnail stream to a monitoring engine (908), and forwarding the incoming AV stream through the one or more AV output ports substantially in real-time (910). Numerous other operations are also within the scope of the present disclosure.

The aforementioned embodiments may use conventional standards for digital program/advertisement insertion, to provide advertisement auditing and reporting, including visual advertisement splice performance, quality, and service assurance. These embodiments enable the captured data to be filtered for particular content/advertisement events, while correlating advertisement splice messages, video content metrics, and captured thumbnails. Reports may thus be generated for advertisers and program content providers which include the aforementioned metrics, including advertisement times, geographic zones, channels, and audience metrics, etc.

It should be understood that any of the features described with respect to one of the embodiments described herein may be similarly applied to any of the other embodiments described herein without departing from the scope of the present disclosure.

The phrase "substantially in real-time", as used herein, refers to a barely perceptible user time, e.g., a few seconds or less. In contrast, an approach that records the material to tape or otherwise, processes the stored material, and then plays the results back would not occur "substantially in real-time".

The flowchart and block diagrams in the Figures illustrate the architecture, functionality, and operation of possible implementations of systems, methods and computer program products according to various embodiments of aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be embodied as a system, method or an article of manufacture such as a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc. Computer program code for carrying out operations of aspects of the present disclosure may be written in an object oriented programming language such as Java, Smalltalk, C++ or the like. However, the computer program code for carrying out operations of aspects of the present invention may also be written in conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A number of implementations have been described. Nevertheless, it will be understood that various modifications may be made. Accordingly, other implementations are within the scope of the following claims.

What is claimed is:

1. A system for monitoring audio-video (AV) streams transported over a network, the system comprising:
at least one AV probe configured for installation at a network node, the at least one AV probe configured to receive an incoming AV stream at a native frame rate and to capture at least one thumbnail of the incoming AV stream at a sampling rate which is less than the native frame rate to form a thumbnail stream, the at least one AV probe further configured to timestamp and transmit the thumbnail stream, and to forward the incoming AV stream substantially in real-time, wherein the at least one AV probe is configured for arrangement between a set top box (STB) and a television;
at least one monitoring engine operatively connected with the at least one AV probe, the at least one monitoring engine configured to receive the thumbnail stream, capture AV data from the thumbnail stream, and transform the AV data into a visual representation of AV stream quality of experience (QoE); and
at least one management server configured to receive an actual audio output measured from the STB and to compare at least one dialnorm value with the actual audio output.

2. The system of claim 1, wherein the at least one AV probe receives the incoming AV stream through an AV input port, transmits the thumbnail stream through a network interface port, and forwards the incoming AV stream through an AV output port.

3. The system of claim 2, wherein the AV input port and the network interface port comprise a single bi-directional port.

4. The system of claim 1, wherein the at least one AV probe is configured for respective installation between an AV tuner and AV destination customer premises equipment.

5. The system of claim 1, wherein the at least one AV probe is configured to store the thumbnail stream for delayed transmission to the monitoring engine.

6. The system of claim 1, wherein said monitoring engine is configured to receive a plurality of thumbnail streams from the at least one AV probe and to capture AV data from each of the plurality of thumbnail streams, the monitoring engine further configured to aggregate and transform the AV data into a visual representation of collective AV stream QoE.

7. The system of claim 1, wherein the at least one AV probe is configured to capture, timestamp, and transmit the thumbnail stream substantially in real-time.

8. The system of claim 1, wherein the monitoring engine is configured to receive, capture, and transform the AV data substantially in real-time.

9. The system of claim 1, wherein the AV data includes at least one of AV content verification data, advertisement insertion data, and black screen detection data.

10. The system of claim 1, wherein the at least one monitoring engine is configured to perform at least one of the following: monitoring advertisements in real-time; monitoring advertisements simultaneously across a plurality of AV streams; monitoring start and stop times of advertisements; verifying that avails were present at scheduled times; detecting SCTE-35 advertisement cue signals; detecting advertisement pre-rolis; detecting advertisement program in/out information; monitoring presence and timing of incoming splice messages; monitoring presence and timing of outgoing splice messages; monitoring splice event IDs; and generating AV quality metrics.

11. The system of claim 2, wherein the AV probe is configured to transmit the thumbnail stream through the network interface port to the monitoring engine.

12. The system of claim 1, wherein said AV probe is configured for receiving user data, and for transmitting the user data through the network interface port to the monitoring engine, the monitoring engine being configured to process the user data.

13. The system of claim 1, wherein said monitoring engine comprises an AV management module configured to collect and aggregate transport stream (TS) data pertaining to one or more transport streams.

14. The system of claim 13, wherein said AV management module is configured to receive AV data from a plurality of monitoring engines.

15. The system of claim 13, wherein said AV management module is configured to correlate the AV data with the TS data.

16. The system of claim 1, wherein the AV stream comprises at least one frame that has been decoded from an AV transport stream.

17. The system of claim 16, wherein the AV stream comprises at least one frame that has been decoded from an MPEG-2 transport stream format.

18. The system of claim 1, wherein the AV data is compared with at least one of an advertisement schedule file and an advertisement verification file to generate a result set, the result set configured to indicate whether an advertisement was displayed correctly, and if not, a reason for a display error.

19. A method for monitoring at least one audio-video (AV) stream transported over a network, the method comprising:
  receiving an incoming AV stream at one or more AV probes at a native frame rate, wherein the one or more AV probes is configured for arrangement between a set top box (STB) and a television;
  receiving an actual audio output measured from the STB and comparing at least one dialnorm value with the actual audio output;
  capturing thumbnails of the incoming AV stream at a sampling rate which is less than the native frame rate, to form a thumbnail stream;
  timestamping the thumbnail stream;
  transmitting the thumbnail stream to a monitoring engine; and
  forwarding the incoming AV stream through the one or more AV output ports substantially in real-time.

20. The method of claim 19, further comprising;
  receiving the thumbnail stream at the monitoring engine;
  capturing AV data from the thumbnail stream; and
  transforming the AV data into a visual representation of AV stream Quality of Experience (QoE).

21. The method of claim 20, wherein capturing comprises capturing AV content verification data.

22. The method of claim 19, further comprising capturing user data.

23. An article of manufacture for monitoring at least one audio-video (AV) stream transported over a network, said article of manufacture comprising:
  a non-transitory computer readable storage medium having a computer readable program code embodied therein, said computer readable program code, when executed by a processor, results in the following:
  receiving an incoming AV stream at one or more AV probes at a native frame rate, wherein the one or more AV probes is configured for arrangement between a set top box (STB) and a television;
  receiving an actual audio output measured from the STB and to compare at least one dialnorm value with the actual audio output;
  capturing at least one thumbnail of the incoming AV stream at a sampling rate which is less than the native frame rate, to form a thumbnail stream;
  timestamping the thumbnail stream;
  transmitting the thumbnail stream to a monitoring engine; and
  forwarding the incoming AV stream through the AV output port substantially in real-time.

24. A system for monitoring audio-video (AV) streams transported over a network, the system comprising:
  at least one AV probe configured for installation at a network node, the at least one AV probe configured to receive an incoming AV stream at a native frame rate and to capture at least one thumbnail of the incoming AV stream at a sampling rate which is less than the native frame rate to form a thumbnail stream, the at least one AV probe further configured to timestamp and transmit the thumbnail stream, and to forward the incoming AV stream substantially in real-time, wherein the sampling rate is less than or equal to at least one of about half the native frame rate or about one third the native frame rate, and the sampling rate is variable based on content of the AV stream; and
  at least one monitoring engine operatively connected with the at least one AV probe, the at least one monitoring engine configured to receive the thumbnail stream, capture AV data from the thumbnail stream, and transform the AV data into a visual representation of AV stream quality of experience (QoE).

25. A method for monitoring at least one audio-video (AV) stream transported over a network, the method comprising:
  receiving an incoming AV stream at one or more AV probes at a native frame rate;
  capturing thumbnails of the incoming AV stream at a sampling rate which is less than the native frame rate, to form a thumbnail stream, wherein the sampling rate is less than or equal to at least one of about half the native frame rate or about one third the native frame rate, and the sampling rate is variable based on content of the AV stream;
  timestamping the thumbnail stream;
  transmitting the thumbnail stream to a monitoring engine; and
  forwarding the incoming AV stream through the one or more AV output ports substantially in real-time.

26. An article of manufacture for monitoring at least one audio-video (AV) stream transported over a network, said article of manufacture comprising:
  a non-transitory computer readable storage medium having a computer readable program code embodied therein, said computer readable program code, when executed by a processor, results in the following:
  receiving an incoming AV stream at one or more AV probes at a native frame rate;
  capturing at least one thumbnail of the incoming AV stream at a sampling rate which is less than the native frame rate, to form a thumbnail stream, wherein the sampling rate is less than or equal to at least one of about half the native frame rate or about one third the native frame rate, and the sampling rate is variable based on content of the AV stream;
  timestamping the thumbnail stream;
  transmitting the thumbnail stream to a monitoring engine; and
  forwarding the incoming AV stream through the AV output port substantially in real-time.

\* \* \* \* \*